(12) United States Patent
Fawarsy

(10) Patent No.: US 10,918,468 B2
(45) Date of Patent: Feb. 16, 2021

(54) SYSTEM FOR THE CLEANING AND DISINFECTING OF GUM SURFACES SURROUNDING IMPLANT STRUCTURES THAT SUPPORT DENTURES

(71) Applicant: Summer Fawarsy, Maghar (IL)

(72) Inventor: Summer Fawarsy, Maghar (IL)

(*) Notice: Subject to any disclaimer, the term of this patent is extended or adjusted under 35 U.S.C. 154(b) by 67 days.

(21) Appl. No.: 16/314,451

(22) PCT Filed: Jul. 2, 2017

(86) PCT No.: PCT/IL2017/000004
§ 371 (c)(1),
(2) Date: Dec. 31, 2018

(87) PCT Pub. No.: WO2018/008011
PCT Pub. Date: Jan. 11, 2018

(65) Prior Publication Data
US 2019/0247171 A1    Aug. 15, 2019

Related U.S. Application Data

(60) Provisional application No. 62/359,212, filed on Jul. 7, 2016.

(51) Int. Cl.
*A61C 17/02* (2006.01)
*A61C 8/00* (2006.01)
*A61C 19/06* (2006.01)

(52) U.S. Cl.
CPC ........ *A61C 17/0211* (2013.01); *A61C 8/0093* (2013.01); *A61C 19/063* (2013.01)

(58) Field of Classification Search
CPC ......... A61C 1/082; A61C 1/084; A61C 1/085; A61C 8/001; A61C 8/0092; A61C 8/0093;
(Continued)

(56) References Cited

U.S. PATENT DOCUMENTS 3,379,192 A * 4/1968 Warren, Jr. ........ A61C 17/0211
601/164
8,202,090 B2    6/2012 Shacar
(Continued)

FOREIGN PATENT DOCUMENTS

WO    2007132275 A1    11/2007
WO    20130140172 A2    1/2013

*Primary Examiner* — Edward Moran
(74) *Attorney, Agent, or Firm* — Smith, Gambrell & Russell LLP (57) ABSTRACT

The preset invention is a system for easy and effective cleaning and disinfecting the gum-denture contact surfaces of a fixated-in-place denture plate, especially for cleaning and disinfecting the surfaces immediately surrounding the implants structures in the gum of the denture wearer that support the denture plate. The system is composed of: a denture plate having a smooth gum contact surface, at least one Denture-Alveolar-Implant Liquid Dispenser (DAILD) and a conduit liquid (or gas) streaming system. Optionally, the system also includes at least one Denture Liquid Sieve-Dispensers (DLSD). Each DAIL is constructed of: a dental implant structure, a locking component, a basin-structure and fastening-component. When liquid (or gas) is injected into the basin structure it flows from DAILD and cleans and disinfects the surrounding area of the DAILD in the denture plate.

17 Claims, 7 Drawing Sheets

(58) Field of Classification Search
CPC ..... A61C 8/0095; A61C 9/0006; A61C 17/02;
A61C 17/0211; A61C 17/028; A61C
19/002; A61C 19/06; A61C 19/063
See application file for complete search history.

(56) References Cited

U.S. PATENT DOCUMENTS

| | | | |
|---|---|---|---|
| 9,801,700 B1 * | 10/2017 | Liberkowski | A61C 17/0211 |
| 2008/0272153 A1 | 11/2008 | Hochstadter et al. | |
| 2009/0317761 A1 | 12/2009 | Van Der Veken et al. | |
| 2015/0282907 A1 | 10/2015 | Urs et al. | |
| 2016/0113739 A1 * | 4/2016 | Honig | A61C 8/0089 |
| | | | 433/173 |

* cited by examiner

SYSTEM FOR THE CLEANING AND DISINFECTING OF GUM SURFACES SURROUNDING IMPLANT STRUCTURES THAT SUPPORT DENTURES

The present invention relates to a system for the cleaning and disinfecting of gum surfaces surrounding implant structures that support dentures.

BACKGROUND OF THE INVENTION

The Merriam Webster (website: www.merriam-webster-.com) gives the following definitions:

Denture: an artificial replacement for one or more teeth; especially: a set of false teeth—also referred to as "dental plate" or "denture plate". In context of the present invention, the term "dentures" refers to "removable dentures" that can be readily placed and removed from the mouth of the user and to "fixated dentures" that requires the activities of a dentistry-professional to be placed and remove from the mouth of the user.

Alveolar: relating to, or constituting the part of the jaws where the teeth arise.

Gum: the alveolar portion of a jaw with its enveloping soft tissues.

Implant: "to place (something) in a person's body by means of surgery". In the context of the present text the term "implant" refers to a dental implant that is a surgical component that interfaces with the bone of the alveolar to support a dental prosthesis such as a crown, bridge or denture.

Dental implants typically connect dentures to the alveolar in a fixated configuration. Typically, the dentures are positioned in place and removed from the mouth of the patient by a procedure carried out by a dentist or another dentistry-professional. The fixated dentures are positioned in contact with the gums of the persons wearing dentures. In large size dentures (typically, supporting more than one tooth), the contact with the gums is not continuous and homogeneous throughout the surfaces of the dentures facing the gums.

In fixated dentures, on the surfaces of the gums and especially in areas in close vicinity to dental implants placed in the alveolar, the physiological conditions encourage the development of microorganisms. The development of microorganisms may cause bad-breath and/or infections. The caused infections may be severe so as to damage the connection between the implant and the alveolar a well as to cause pain and deteriorate the general health of the person having the implants in his or her mouth. To prevent the development of the microorganisms that thrive on the gums of patients wearing dentures, "maintenance activities" are required. Typical "maintenance activities", referred to as "mechanical oral hygiene practices", are usually done by mechanical means such as but not limited to, brushing and/or water squirting and/or disinfecting solution, and are limited in their effectiveness. The limited effectiveness is due to the enclosure of the surfaces to be treated, especially areas in close vicinity to implants, between the gums and the dentures. The "maintenance activities" physically remove the microorganisms as well as disinfect the treated areas against remaining and new microorganisms. The "maintenance activities" also include the removal of "entrapped" food particles that may serve as growth-media for microorganisms.

In the described "cleaning and disinfecting of gum surfaces surrounding implant structures that support dentures" in the present invention, the term "liquid" refers to, but not limited to, water. The used liquid can also be a water or an organic solvent solution of a disinfection medication or/and an dental-treatment medicinal-drug.

Alternatively to using a liquid for the cleaning and disinfecting of gum surfaces surrounding implant structures that support dentures" in the present invention, pressured gas be used. The term "gas" refers to, but not limited to, air and may be any gas(es) used in dental treatments.

In general, mechanical oral hygiene practices include the removal of dentures not fixated by implants.

A classical method for the cleaning and disinfecting removable dentures, when worn as well as when not in use and for cleaning and disinfecting fixated dentures, is the spraying of a jet of water or a jet of a mouth-wash solution on the surfaces and/or side of the dentures by a device commonly known as a "water flosser". An example of water flosser devices is shown in the web sites of the Waterpik Company.

An example of a device for the cleaning and disinfecting removable dentures by injecting a controlled amount of mouth-wash at a predetermined temperature and pressure is given in WO2007/132275 (Xanthopoulos), in which is mounted on the exposed (mouth side) surfaces of the upper and lower dentures.

Additional examples of mechanical devices for washing and disinfecting of removed-from-gums dentures are given in: WO99/23974 (Williams) and U.S. Pat. No. 6,390,104 (Gagon).

The present invention is an effective and easy to use, system for the cleaning and disinfecting gum surfaces of fixated dentures, especially of gum surfaces in the close proximity to implants that support the fixated dentures. The system of the present invention removes and disinfects against microorganisms as well as washes out "entrapped" food and other particles from surfaces of the gums and especially surfaces immediately surrounding the dental implants supporting the dentures.

SUMMARY OF THE INVENTION

In cases where more than a few teeth are missing, typically a relatively large denture is used, referred to in the text that follows as: "denture-plate". The denture plate has false teeth on one side and on the opposite side a gum-contacting surface that rests on the gum of the wearer. In a fixated-in-place denture plate, the plate is typically connected to the alveolar of the wearer by dental implants.

The preset invention is a system for easy and effective cleaning and disinfecting the gum-denture contact surfaces of a fixated-in-place denture plate, especially for cleaning and disinfecting the surfaces immediately surrounding the implants structures in the gum of the denture wearer that support the denture plate. The longer the time elapse between cleaning episodes of the denture while the denture is in place in the mouth of the wearer, the greater the risk of microbiological infections as well as bad-breath incidences.

The system for the cleaning and disinfecting of gum surfaces surrounding implants that support dentures of the present invention is composed of: a denture plate having a smooth gum contact surface, at least one Denture-Alveolar-Implant Liquid Dispenser (DAILD) and a conduit liquid streaming system.

Each DAIL is constructed of: a dental implant structure, a locking component, a basin-structure and fastening-component.

The locking component, basin-structure and fastening-component of each DAIL and the conduit liquid streaming system are embedded in pre-defined "dug in" structure in the denture plate and form a smooth surface alignment configuration with the gum contact surface of the denture plate. The term "dug in" structure refers to predefined channel (or channels) and cavities that penetrate into the surface of the denture plate (12) and are produced by (and not limited to): etching or/and drilling and/or pre-casting into plate (12).

The dental implant structure is implanted into the alveolar of the wearer of the denture plate and has a hollow tube structure.

The locking component is constructed of: a plate with a protruding bar that connects and fixates to the hollow tube in the dental implant on one side and a hollow tube that connects and fixates to the fastening component on its other side.

The fixated connections of the locking component maintains the denture plate in a fixated contact with the gum of the denture wearer, leaving narrow gaps between the gum and the gum contact surface of the denture plate.

The basin structure is composed of a cylinder vessel with an opened side and a tube running through the center of the vessel, The fastening-structure is composed of a bar with an expansion of the bar at one of the its ends.

The basin structure is embedded in the denture plate and is fixated in place in the denture plate by the fastening component that runs through the denture plate, through the tube in the basin structure and connects tightly with the locking component by inserting into hollow tube in the locking component.

The conduit liquid streaming system is constructed of a connected-assembly of tubular components having various structural configurations, that together construct a conduit. The conduit liquid streaming system has a liquid entry port, optionally, having a tumble configuration. The conduit liquid streaming system connects to the cylinder vessel of the basin structure.

When liquid injected into the conduit liquid streaming system reaches the cylinder vessel of the basin structure and flows from the rim of the cylinder vessel, the water flow cleans and disinfects the gum area immediately surrounding the DAILD in the denture plate as well as the gum area more distant that surrounds the dental implant structure.

Optionally, the system for the cleaning and disinfecting of gum surfaces surrounding implants that support dentures of the present invention has in addition to at least one DAILD, at least one Denture Liquid Sieve-Dispensers (DLSD). Each DLSD is constructed of: a hollow half-sphere vessel component connected in its open-side to a sieve plate component and perturbing tube from the bottom of the half-sphere vessel component. Each DLSD is embedded into the denture plate so as to form a smooth alignment of the DLSD with the gum contact surface of the denture plate.

In each DLSD the conduit liquid streaming system connects to the perturbing tube of the half-sphere vessel component.

In each DLSD, when liquid injected into the conduit liquid streaming system reaches the half-sphere vessel component and flows through sieve plate component to the surrounding area, it cleans and disinfects the area surrounding the DLSD.

Furthermore, the design and manufacturing of the "dug in" structures in which the DIALD, DLSD and conduit liquid streaming system are embedded, are hand made or/and designed and by a computerized controlled system.

Furthermore, each of the components: the DIALD, the DLSD and the conduit liquid streaming system in the system of the present invention is designed and manufactured by hand or/and designed and manufactured by a computerized controlled system.

An example of a computerized controlled designing system is the use of a computer-aided drafting (CAD)-designing software such as SolidWorks. An example of a computer controlled manufacturing system is the use of 3D printing machines such as produced by the 3D Company.

Furthermore, in system of the present invention the DIALD, the DLSD and the conduit streaming system of the system of the invention stream, dispense and discharge a gas as an alternative to a liquid.

BRIEF DESCRIPTION OF THE DRAWINGS

In order to better understand the present invention, and appreciate its practical applications, the following Figures are provided and referenced hereafter.

It should be noted that the Figures are given as examples only and in no way limit the scope of the invention. Like components are denoted by like reference numerals.

FIG. 10A$_1$ shows a "cross configuration" component FIG. 10A$_2$ shows a "T" configuration component; FIG. 10A$_3$ shows an "L" configuration component and FIG. 10A$_4$ shows a "straight-tube" configuration component.

FIG. 10B$_1$ shows a crosscut view of the "cross configuration" component FIG. 10B$_2$ shows a crosscut view of the "T" configuration component; FIG. 10B$_3$ shows a crosscut view of the "L" configuration component; and FIG. 10B₄ shows a crosscut view of the "straight-tube" configuration component.

DETAILED DESCRIPTION OF A PREFERRED EMBODIMENT

The present invention is a system (10) for cleaning and disinfecting of gum surfaces around implants that support dentures (12) that is easy to operate and is efficient in its performance.

A fixated-in-place denture plate (12) typically has false teeth (24) on one side and on the opposite side a gum-contact surface plate that is fixated over the gum of the wearer, leaving as little gaps as possible between the denture plate (12) and the gum. The term "gap" in the context of the present text refers to continuously existing spaces between the denture plate (12) and the gum as well as to "temporary spaces" that form when a pressure is applied on the denture plate (12). In order to maintain the denture plate fixed in place over the gum of the wearer, the denture-plate (12) connects to dental implant structures (30) that are embedded in the alveolar of the wearer (referred to interchangeably as the "patient").

In using the system (10) of the present invention a denture wearer discharges at will a liquid, typically, but not limited to, water or a disinfecting solution, from dispensing elements embedded in the denture plate, into the gap(s) between the denture plate (12) and the gum denture-contact surface. The term "discharging" is used interchangeably in the text with the term "dispensing". The denture plate embedded dispensing elements are connected and surround the gum protruding portions of the dental implants embedded in the alveolar of the wearer of the plate denture. The discharged liquid from the dispensing elements initiates its flow from the gum surface areas immediately surrounding the dental implants and proceeds towards the more distant gum surface areas, thus, the maximal cleaning and disinfecting effects are obtained in the areas surrounding the dental implants.

Alternatively to dispensing a liquid, the dispensing elements discharge a gas, typically but not limited to, pressured air. References in the text and in the figures that describe the flow (streaming) and discharge of a liquid(s) refers interchangeably also to the use of gas in system (10).

The system (10) of the present invention is constructed of a denture plate (12), at least one liquid dispensing element, each element is referred to as a Denture-Alveolar-Implant Liquid (or gas) Dispenser, abbreviated as: DAILD (14). Optionally, the system also includes at least one of a second type of liquid dispensing element, where each second type element is referred to as a Denture-Liquid (or gas) Sieve-Dispenser, abbreviated as DLSD (16). In addition, the system includes a conduit liquid (or gas) streaming system (61) constructed of an assembly of conduit elements. The conduit streaming system (61) starts at an entry port (20) and connects to each of the DAILDs (14) (and DLSD (16)). A schematic illustration of the system for the cleaning and disinfecting of gum surfaces around implants that support dentures (10) is given in FIG. 1.

The denture plate (12) used in the system (10) of the present invention is made of standard dentally-used materials and is constructed as a standard fixed-in-place denture with the addition of the components of the system (10) listed above and described below in the text.

Figure 1:
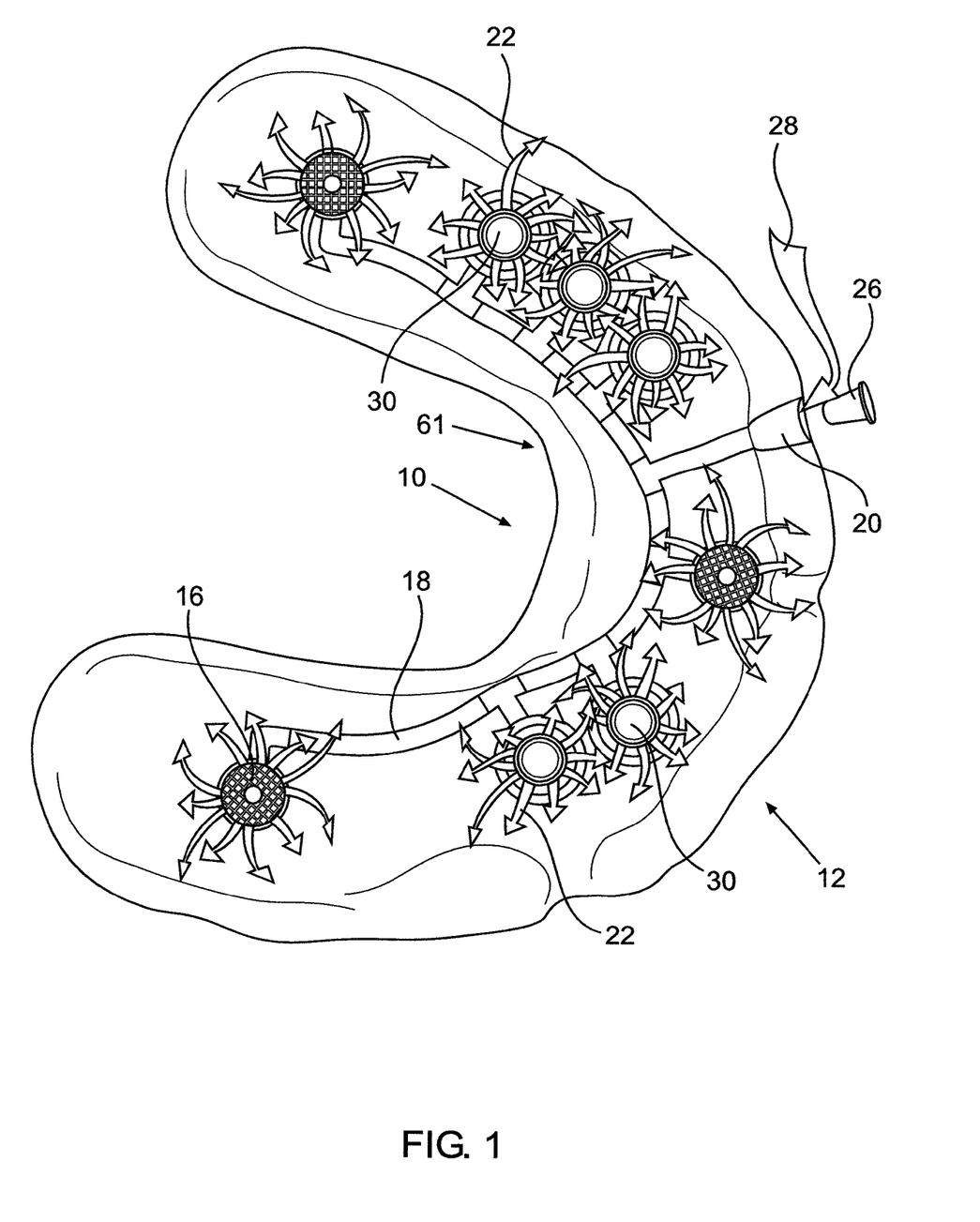
FIG. 1 is an illustration, as seen from above, of the cleaning and disinfecting system cleaning and disinfecting of surfaces around implants that support dentures of the present invention, fixated in an alveolar of a patient, with arrows indicating the streaming of a liquid (or gas).

Focus is presently turned to the figures:

FIG. 1 is an illustration of the system for the cleaning and disinfecting of gum surfaces around implants that support dentures (10) positioned in the gum contact surface side of the denture plate (12), as seen from above. The DAILDs (14) and DLSDs (16) are shown discharging liquid to the areas around their circumference. The streaming liquid is indicated by arrows (22). The liquid enters the system (10) via entry port (20), flows through the conduit (18) and is discharged by the DAILDs (14) and DLSDs (16). Optionally, a liquid-tight stopper (26) reversibly connects to entry port (20). In order to inject liquid into the system, stopper (26) is removed from entry port (20) and the liquid is pressured/injected into the conduit (18), typically but not limited to, by a syringe. The emptying of the syringe forces the liquid into the conduit (18). After the liquid injection, stopper (26) is re-connects to entry port (20). The liquid stream that enters the system (10) is designated by arrow (28).

Figure 2:
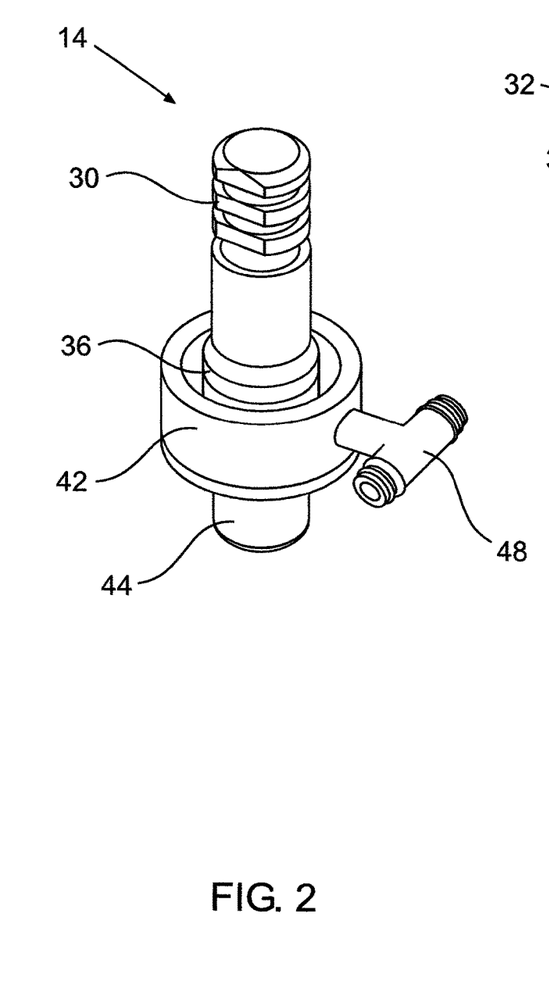
FIG. 2 is an isometric illustration, seen from the side, of a Denture-Alveolar-Implant Liquid (or gas) Dispenser (abbreviated as: DAILD), shown in an assembled configuration.
Figure 3:
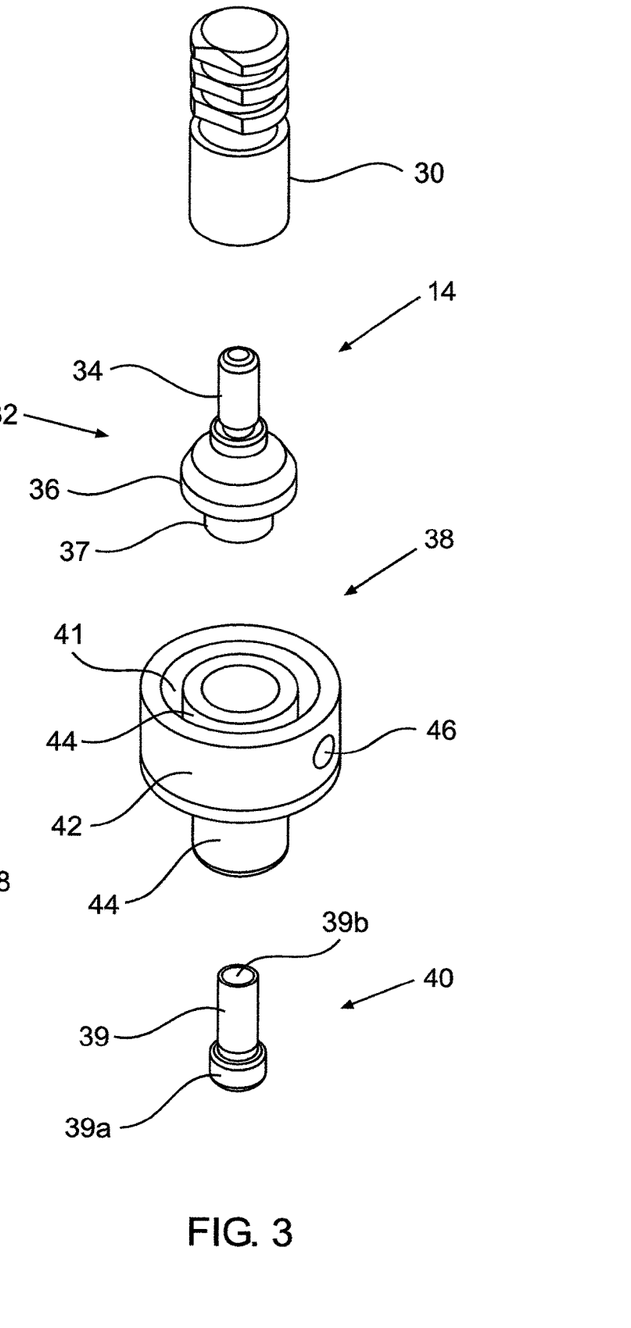
FIG. 3 is an isometric illustration, seen from the side, of the DAILD shown in FIG. 2, in a disassembled configuration.
Figure 4:
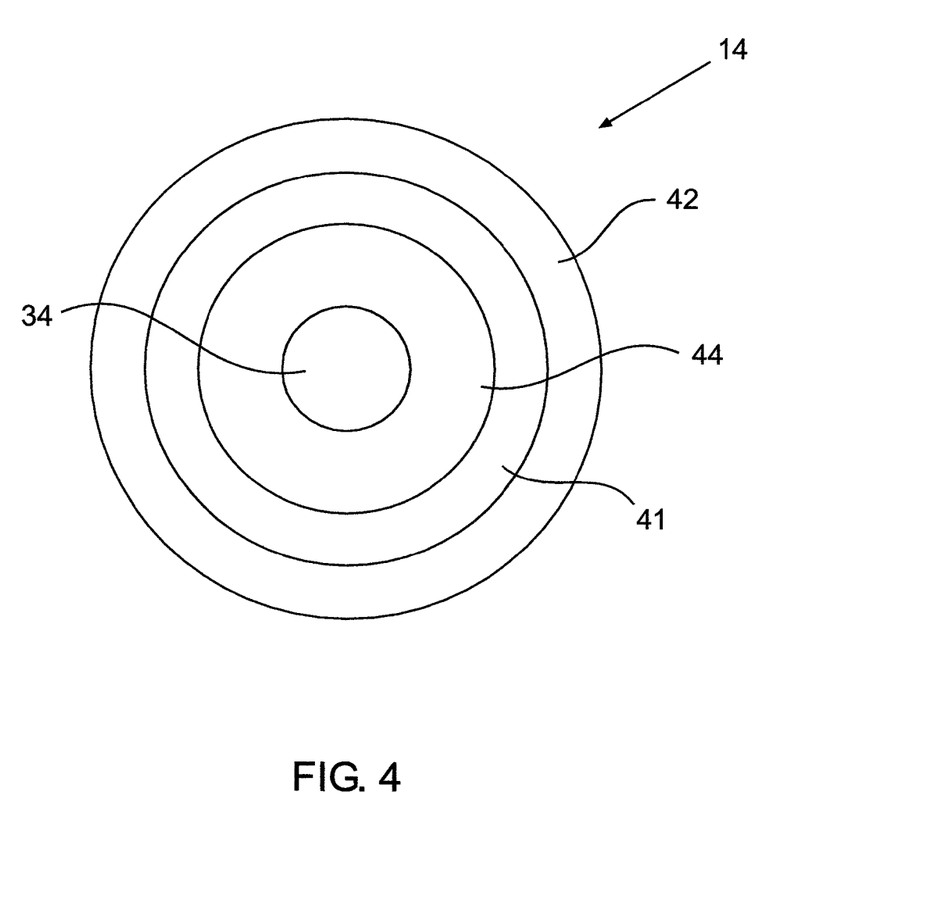
FIG. 4 is an illustration, seen from above, of a DAILD, shown in FIG. 2.

The structure of the DAILDs (14) and their fixation in a denture plate (12) is presently explained, utilizing FIG. 2, FIG. 3 and FIG. 4.

FIG. 2 isometric illustration, seen from the side of a DAILD (14) shown in an assembled configuration. FIG. 3 is an isometric illustration, seen from the side, of a DAILD (14) in a disassembled configuration. FIG. 4 is an illustration, seen from above, of a DAILD (14), shown in FIG. 2.

Each DAILD (14) is composed of: a hallow-tube dental implant structure (30), a locking component (32), a basin-structure (38) and fastening-component (40).

Dental implant structure (30) is made of a rigid material hollow-tube that is embedded and fixated in the alveolar of the wearer (the fixation in the alveolar not shown in the figures).

The locking-structure (32) is constructed of: 1) implant tube connection tube (34), 2) a dome structure (36) having a flat bottom-side 3) a tube (37) that connects and protrudes from the bottom-side of dome structure (36). Typically, inside tube (37) is a protruding threaded screw (not shown) that fits into the inner-side screw thread of tube (39), as explained later in the text.

Basin-structure (38) is composed of a circular liquid container (42) with a hollow tube (44) that runs through it. Tube (44) protrudes from the bottom, closed-side, of the container (42). A gap is left between tube (44) and the wall of container (42), designated (41). The wall of container (42) has an opening (46) that connects to the conduit (18) by a sub-element of the conduit, designated (48) in FIG. 3 (see in FIG. 10A element b).

Fastening-component (40) is constructed of a hollow tube (39) that has an expanded portion at one of its ends (39a) and on its other end, a hole (designated: 39b). The inner side of component (40), from opening 39b towards expanded-portion (39a), has a screw thread (not seen) that matches the screw inside tube (37).

In an assembled configuration, illustrated in FIG. 3, fastening-component (40) runs through hollow tube (44) of basin-structure (38) and inserts into tube (37) of locking-structure (32). The screw (not shown) inside tube (37) inserts into hole (39(*b*)) in tube (39) in fastening-structure (40) and is interlocked in the screw thread inside tube (39) (not seen). Dental implant structure (30) which is embedded in the alveolar of the denture wearer, interlocks and is fixated with implant tube connection tube (34).

In fixating in place of each of the DAILDs (14) in a denture plate (12), a hole is drilled through the denture plate for each DAILDs (14). Fastening-component (40) is inserted through the hole in the denture plate (12), expanded portion (39a) of tube (39) prevents tube (39) from "escaping" from the hole. Tube (39) that was inserted into the hole in denture plate (12) is inserted through tube (44) of basin-structure (38) and into tube (37) of locking-structure (32). The screw inside tube (37) interlocks with the screw threads inside tube 39. By tightening the screw inside tube (37) each of the DAILDs (14) is rigidly fixated into the denture plate (12) structure. By inserting and fixating implant tube connection tube (34) in dental implant structure (30), denture-plate (12), with system (10) is fixated in place in contact with the surfaces of the gums of the denture wearer.

In order to further clarify the construction of a DAIL (14), FIG. 4 illustrates an DAIL as seen from above.

Figure 5:
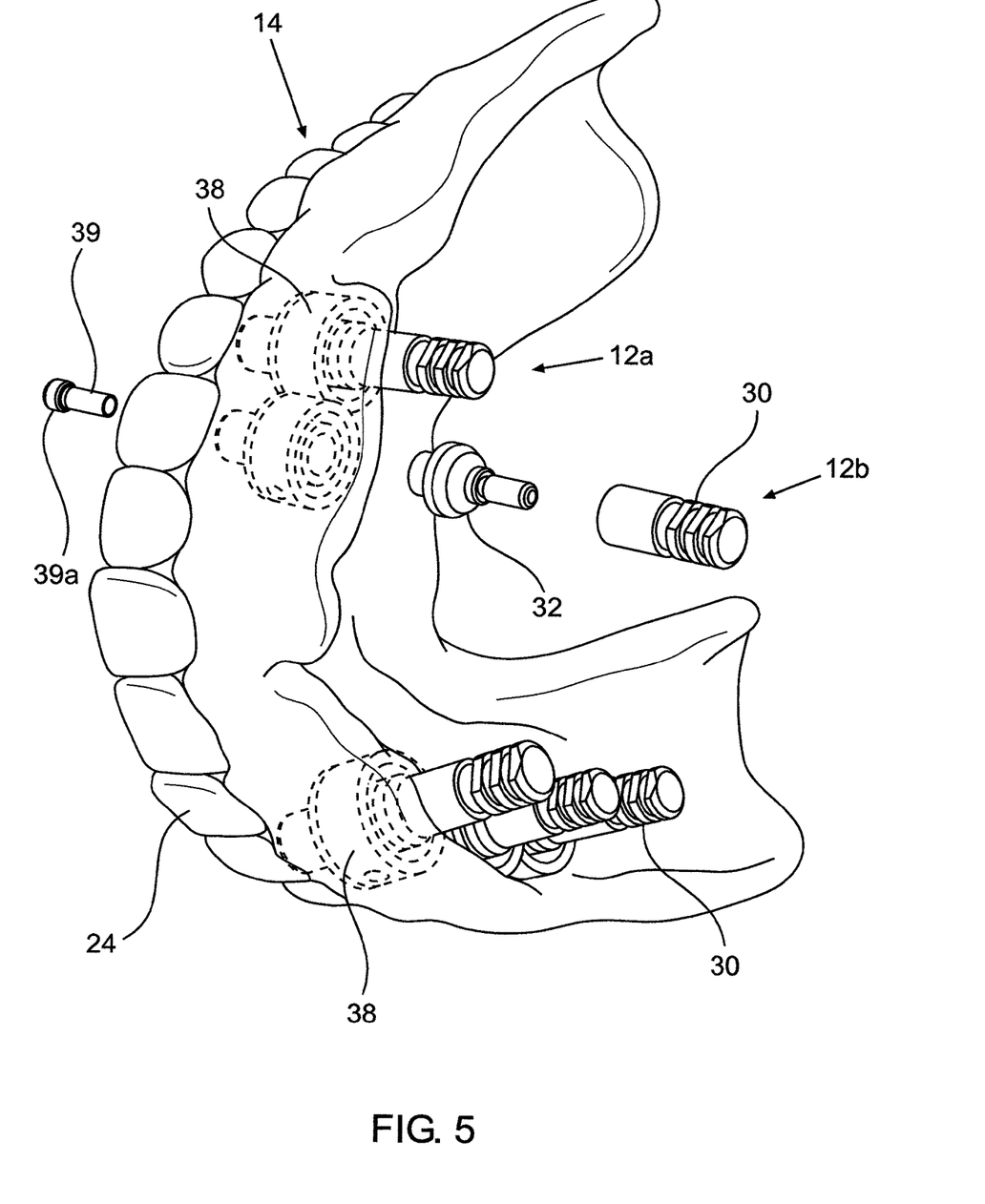
FIG. 5 is an isometric illustration, seen from above and side, of DAILDs shown positioned in a denture-plate.

FIG. 5 is an isometric illustration, seen from above, of DAILDs (14) fixated into the denture plate (12). DAIL-s (14) are shown in an assembled (12a) and disassembled (12b) configuration. The rim of the walls of container (42) of the DAILDs (14) (shown in FIG. 2, FIG. 3 and FIG. 4) are fixated into the denture plate (12) so as to be in a smooth alignment with the surface of the denture plate (12). The alignment of the DAILDs (14) enables to minimize the gaps between the denture plate (12) and the gums. The path of conduit (18) that streams the liquid from port (26) to the DAILDs (14) (and optionally, to the DLSD (16)), as well as the cavities in which the DAILDs (14) and DLSDs (16) are imbedded in the denture plate (12) are illustrated in FIG. 1. The path and cavities are predefined structures that are "dug in" into the surface of the denture plate (12) in a manner that the conduit (18), the DAILDs (14) and the DLSDs (16) form a smooth alignment configuration with the with the gum-contact-surface of the denture plate (12). The term "dug in" refers to a predefined channel(s) and cavities formed by etching or/and drilling and/or pre-casting into the surface of the denture plate (12).

The predefined "dug in" structures in the denture plate as well as the DLSDs (16), the DAILDs (14) and the conduit (18) are designed and manufactured by hand or/and designed and manufactured by a computerized system.

Liquid injected into port (20), flows through conduit (18) and exits DAILDs (14) through gaps (41) in basin-structures (38), shown in FIG. 3 and FIG. 4. The liquid that exits from gaps (41) is dispensed in the area surrounding the DAILDs (14). The dispensed liquid starts by cleaning and disinfecting the areas immediately surrounding the alveolar imbedded dental implant structures (30) and proceeds to clean and disinfect farther areas of the denture plate (14), as illustrated in FIG. 1.

Figure 6A:
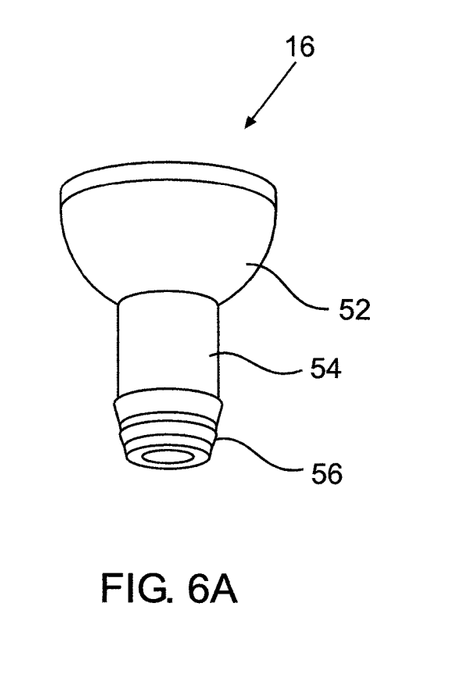
FIG. 6A is an isometric illustration, seen from the side, of a Denture Liquid (or gas) Sieve-Dispenser (abbreviated as: DLSD).
Figure 6B:
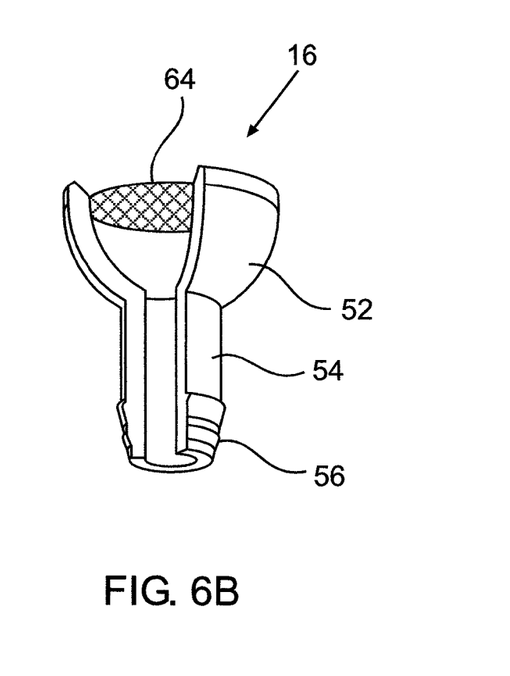
FIG. 6B is an isometric illustration, crosscut view, of the DLSD illustrated in FIG. 6A.

The structure of the DLSDs (16) is presently explained:
The DLSDs (16) are optional liquid (or gas) dispensers that complement the cleaning and disinfecting functions of the DAILDs (14) and do not have a gum-denture connection function. The structure and function of the DLSDs (16) is clarified in: FIG. 1 and FIG. 6A, FIG. 6B.

Figure 7:
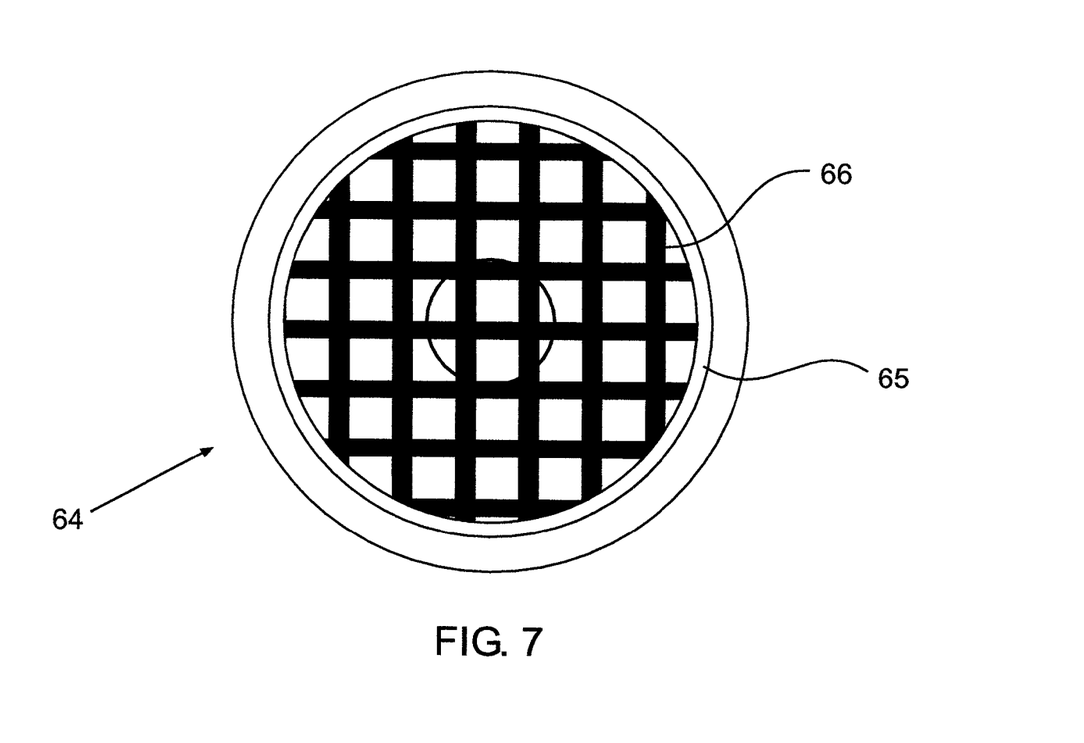
FIG. 7 is an illustration, seen from above, of a DLSD, shown in FIG. 6.

FIG. 6A is an isometric illustration, seen from the side, of a DLSD (16), FIG. 6B is an isometric cross cut illustration of the DLSD (16), shown in FIG. 5A. FIG. 7 is an illustration, seen from above, of a DLSD (16), shown in FIG. 6A.

The DLSDs (16) are composed of a hollow half-sphere component (52) connected in its open-side to sieve plate (64). Sieve plate (64) is constructed of a sieve (66) made of a rigid material, fixated in place by a rigid material rim-frame (65). A tube (54) protrudes from the bottom of the half-sphere (52). The tip of bar (54) is made of protruding rings (56), which enable the connection of the DLSDs (16) to conduit (18), as illustrated in FIG. 1.

The DLSDs (16) are fixated into the denture plate (12) so that the sieve plates (64) are in smooth alignment with the surface of the denture plate (12). Tubes (54) of the DLSDs (16) connect to conduit (18), which is in smooth alignment with the surface of the denture plate (12), as was previously explained.

Liquid entering the half-sphere component (52) of the DLSDs (16) from conduit (18) fills the component (52) and overflows. The overflown liquid exits through sieve plate (64) and is dispensed in the area surrounding the DLSDs (16), as illustrated in FIG. 1.

Liquid injected into port (26) flows through conduit (18) and is dispensed simultaneously from the DAILDs (14) and the DLSDs (16), as illustrated in FIG. 1. While the primary objective of deploying the DAILDs (14) is the cleaning and disinfecting the immediate surrounding areas of the dental implant structures (30) in the gum of the denture wearer, the objective of deploying the DLSDs (16) is to complement the cleaning and disinfecting of the areas of the gum cleaned by the DAILDs (14) beyond the immediate surrounding areas of the dental implants structures (30).

The structure of the conduit streaming system (61) in the system of the present invention (10) is presently explained:
The conduit streaming system (61) is composed of the connection of:
a liquid inlet funnel (20), illustrated in FIG. 8A and FIG. 8B,
a liquid-stopper (26), illustrated in FIG. 9A and FIG. 9B and
four types of components, illustrated in FIG. 10A and FIG. 10B, designated (47) to and including (50).

The assembly of the components (47), (48), (49) and (50) is referred to as the conduit (18) of the system (10) of the present invention and is the main the main structure in the conduit streaming system (61).

Figure 8A:
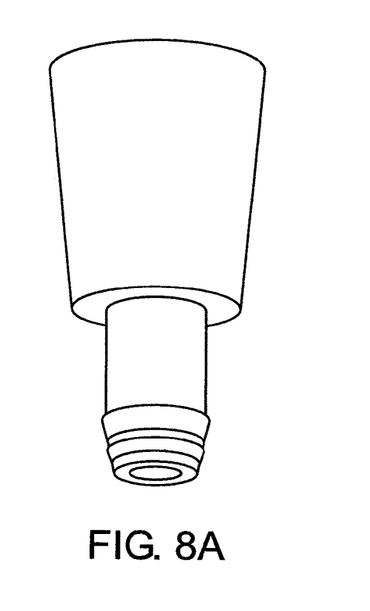
FIG. 8A is an isometric illustration, seen from the side, of an inlet funnel for liquid (or gas).
Figure 8B:
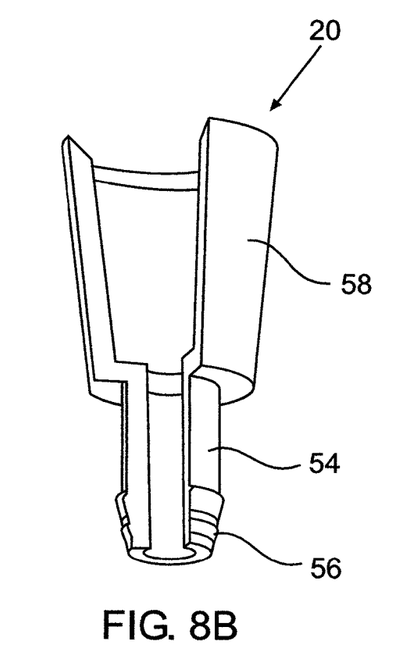
FIG. 8B is an isometric illustration, crosscut view, of the inlet funnel for liquid (or gas) illustrated in FIG. 8A.

FIG. 8A is an isometric illustration, seen from the side, of a liquid inlet funnel (20) that streams liquid into the conduit (18), FIG. 8B is a crosscut isometric illustration, seen from the side, of the liquid inlet funnel (20) shown in FIG. 8A. The funnel is constructed of a connection-element (58), to which a tube, a syringe or other means of injecting a liquid into conduit (18) connects and a hollow bar (54) that protrudes from connection-element (58). The tip of bar (54) is made of protruding rings (56) which enable the connection of the hollow bar (54) to conduit (18).

Liquid inlet funnel (20) is inserted through a predefined hole in the denture-plate (12), thus, connecting the connection-element (58) via hollow bar (54) to the conduit (18) in the denture plate (12), as illustrated in FIG. 1.

Figure 9A:
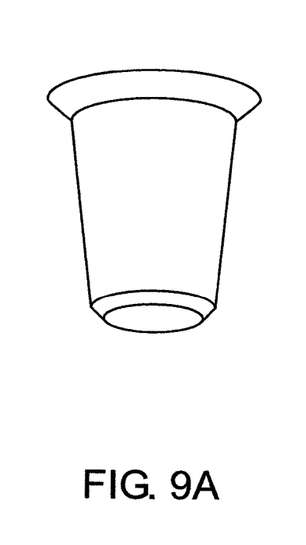
FIG. 9A is an isometric illustration, seen from the side of a liquid (or gas) stopper.
Figure 9B:
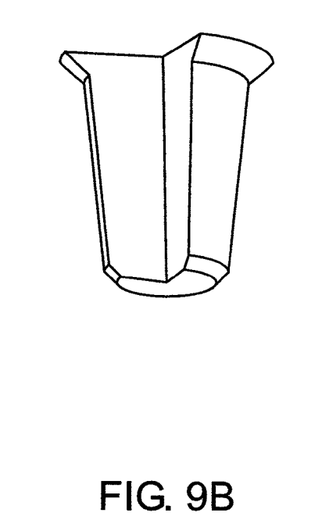
FIG. 9B, is an isometric illustration, crosscut view a liquid (or gas) stopper illustrated in FIG. 9A.

FIG. 9A is an isometric illustration, seen from the side, of a liquid stopper (26) in the shape of a thimble. FIG. 9B is a crosscut isometric illustration of the liquid stopper (26) shown in FIG. 9A. Stopper (26) is inserted and removed into and from connection-element (58) of the liquid inlet funnel (20) at will and is utilized for preventing liquid from flowing from the conduit (18) or for (when removed) to inject liquid into the conduit, respectively. The use of liquid stopper (26) s illustrated in FIG. 1.

Figure 10A:
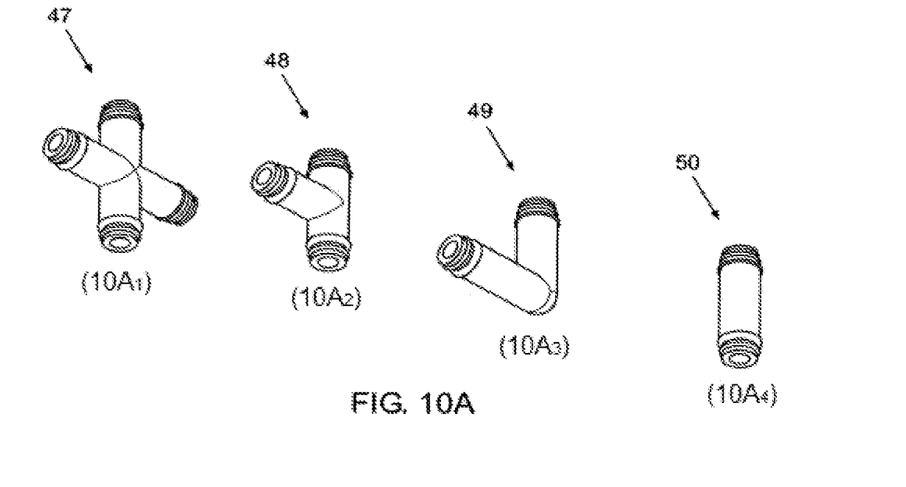
FIG. 10A presents isometric illustrations of four different components that when assembled in various connection-configurations construct a conduit for liquid (or gas) flow in the system for cleaning and disinfecting of gum surfaces around implants that support dentures in the system of the present invention.
Figure 10B:
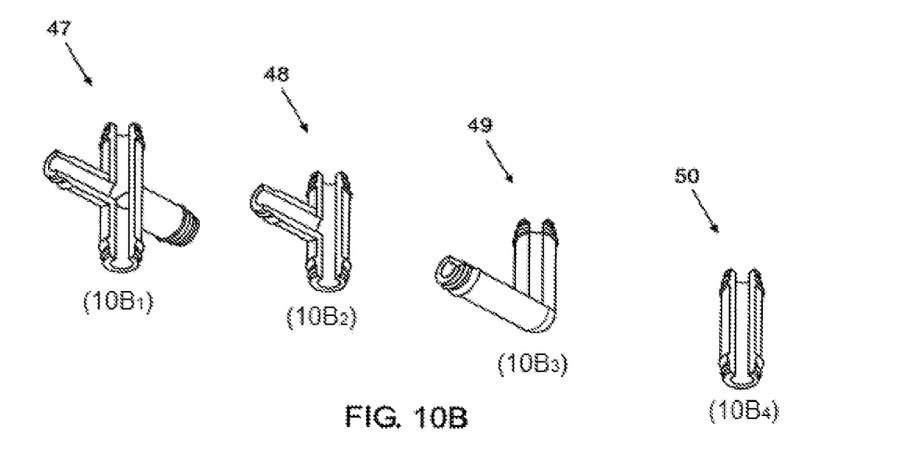
FIG. 10B presents isometric illustrations of the four different components of FIG. 10A in a crosscut view.

FIG. 10A and FIG. 10B illustrate four types of hollow components, that, when assembled in connected-configurations, construct conduit (18).

Component (47) has a "cross configuration", component (48) has a "T" configuration, component (49) has an "L" configuration and component (50) has a straight-tube configuration. All four components are constructed of hollow-tubes made of semi-rigid material.

The Denture-Alveolar-Implant Liquid Dispenser (DAIL) (14), the a conduit liquid streaming system and the Denture Liquid Sieve-Dispensers (DLSD) (16) of system of the present invention (10), all have to be positioned in precise locations in the denture plate so as to be optimally effective while minimizing the discomfort of the wearer. In addition, the designing, manufacturing and assembling of the components that construct the DLSF (14) and DLSD) (16) requires elaborate designing (tailored-made components, in some cases) and delicate manufacturing-precision. Thus, DAIL (14), the a conduit liquid streaming system and the DLSD (16) can be hand-designed and manufactured but typically the System (10) is designed and manufactured by a computerized controlled system.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

I claim:

1. A system for the cleaning and disinfecting of gum surfaces surrounding denture support structures, said system comprises:
    a denture plate having a gum contact surface;
    at least one Denture-Alveolar-Implant Liquid Dispenser (DAILD); and
    a fluid streaming system, wherein
    each said DAILD comprises:
        a dental implant structure,
        a locking component,
        a basin-structure, and
        a fastening-component,
    said fluid streaming system comprises a connected assembly of a plurality of tubular components that construct a conduit, said plurality of tubular components comprising tubular components of different structural configurations,
    said locking component, basin-structure, and fastening-component of said DAILD and said fluid streaming system are embedded into said denture plate, and said dental implant structure is adapted for implanting into the alveolar of a wearer of said denture plate,
    said dental implant structure comprises a hollow tube,
    said locking component comprises a plate with a protruding bar at a first side that connects and fixates to said hollow tube in said dental implant structure and a hollow tube at a second side that connects and fixates to said fastening component,
    said fixated connections of said locking component are adapted to maintain said denture plate in a fixated contact with the gum of said denture wearer,
    said basin structure is composed of a cylinder vessel with an opened side and a tube running through the center of the cylinder vessel,
    said fastening component is composed of a bar with an expansion of the bar at one end of said bar,
    said basin structure is embedded in said denture plate and is fixated in place in said denture plate by said fastening component that runs through said denture plate, through said tube in said basin structure and connects with said locking component by inserting into said hollow tube in said locking component,
    said fluid streaming system connects to said cylinder vessel of said basin structure and is adapted such that liquid injected into said fluid streaming system reaches said cylinder vessel of said basin structure and flows from a rim of said cylinder vessel, such that said liquid flow cleans and disinfects an immediate surrounding area of said DAILD in said denture plate and in an immediate surrounding area of said dental implant structure, and
    said system also comprises at least one Denture Liquid Sieve-Dispensers (DLSD), said DLSD comprises:
        a hollow half-sphere vessel component having an open-side connected to a sieve plate component and a tube protruding from a bottom of said half-sphere vessel component, said DLSD being embedded into said denture plate with said fluid streaming system being connected to said protruding tube of said half-sphere vessel component,
        wherein, said fluid streaming system is adapted such that liquid injected into said fluid streaming system reaches said half-sphere vessel component and flows through said sieve plate component to a surrounding area for cleaning and disinfecting an area surrounding the DLSD.

2. The system of claim 1, wherein, said rim of said cylinder vessel is aligned with the gum contact surface of the denture plate.

3. The system of claim 1, wherein an entry port of said fluid streaming system has a funnel configuration.

4. A method of cleaning and disinfecting gum surfaces surrounding denture support structures using the system of claim 1, comprising: introducing a gas flow into an entry port of said fluid streaming system for cleaning and disinfecting gum surfaces surrounding the dental implant structure.

5. A method of making a system of claim 1, comprising: designing the denture plate by a computerized controlled system.

6. A method of making a system of claim 1, comprising: manufacturing the denture plate by a computerized controlled system.

7. A method of making a system of claim 1, comprising: designing the DAILD by a computerized controlled system.

8. A method of making a system of claim 1, comprising: manufacturing the DAILD by a computerized controlled system.

9. A method of making a system of claim 1, comprising: designing and manufacturing the DAILD by hand.

10. A method of making a system of claim 1, comprising: designing the DLSD by a computerized controlled system.

11. A method of making a system of claim 1, comprising: manufacturing the DLSD by a computerized controlled system.

12. A method of cleaning and disinfecting gum surfaces surrounding denture support structures using the system of claim 2, comprising: introducing a gas flow into an entry port of said fluid streaming system for cleaning and disinfecting gum surfaces surrounding the dental implant structure.

13. A method of cleaning and disinfecting gum surfaces surrounding denture support structures using the system of claim 3, comprising: introducing a gas flow into said entry port of said fluid streaming system for cleaning and disinfecting gum surfaces surrounding the dental implant structure.

14. A method of cleaning and disinfecting gum surfaces surrounding denture support structures using the system of claim 1, comprising: introducing a gas flow into an entry port of said fluid streaming system for cleaning and disinfecting gum surfaces surrounding the dental implant structure.

15. A method of making a system of claim 2, comprising: designing and manufacturing the DAILD by hand.

16. A method of making a system of claim 3, comprising: designing and manufacturing the DAILD by hand.

17. A method of making a system of claim 1, comprising: designing and manufacturing the DAILD and the DLSD by hand.

\* \* \* \* \*